United States Patent
Srikanth et al.

(10) Patent No.: US 6,556,547 B1
(45) Date of Patent: Apr. 29, 2003

(54) METHOD AND APPARATUS PROVIDING FOR ROUTER REDUNDANCY OF NON INTERNET PROTOCOLS USING THE VIRTUAL ROUTER REDUNDANCY PROTOCOL

(75) Inventors: Ayikudy Srikanth, Reading, MA (US); Tom Meehan, New York, NY (US); Hamayon Mujeeb, Chelmsford, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/212,129

(22) Filed: Dec. 15, 1998

(51) Int. Cl.[7] .......................... G01R 31/08; H04L 12/28; H04J 3/16
(52) U.S. Cl. .................. 370/317; 370/389; 370/401; 370/469
(58) Field of Search ................. 370/217–219, 370/244, 254, 389, 400, 401, 466, 467, 248, 242, 225, 228, 220, 216, 469; 714/3, 4, 25, 43, 56; 709/222, 242

(56) References Cited

U.S. PATENT DOCUMENTS

| | | | | |
|---|---|---|---|---|
| 6,049,834 A | * | 4/2000 | Khabardar et al. | 709/242 |
| 6,148,410 A | * | 11/2000 | Baskey et al. | 714/4 |
| 6,256,314 B1 | * | 7/2001 | Rodrig et al. | 370/401 |
| 6,262,977 B1 | * | 7/2001 | Seaman et al. | 370/256 |

* cited by examiner

Primary Examiner—Huy D. Vu
Assistant Examiner—Duc Ho
(74) Attorney, Agent, or Firm—Blakely Sokoloff Taylor & Zafman LLP

(57) ABSTRACT

A router providing router redundancy and fail-over protection for Internet Protocol (IP) and at least one other network layer protocol. The router Includes means for determining if the router has Virtual Router Redundancy Protocol (VRRP) enabled, means for determining if the router is a master virtual router for IP traffic, means for configuring the router with a VRRP based Media Access Control (MAC) address that overrides a physical MAC address assigned to a port at which VRRP is enabled, and means for transmitting the VRRP based MAC address in a Routing Information Protocol (RIP) update packet.

14 Claims, 4 Drawing Sheets

METHOD AND APPARATUS PROVIDING FOR ROUTER REDUNDANCY OF NON INTERNET PROTOCOLS USING THE VIRTUAL ROUTER REDUNDANCY PROTOCOL

BACKGROUND OF THE INVENTION

1. Field of the Invention

The present invention is related to data communications. In particular, the present invention is related to providing router redundancy in a statically configured routing environment for multiple protocols using the virtual router redundancy protocol (VRRP).

2. Description of the Related Art

The Transport Control Protocol/Internet Protocol (TCP/IP) suite of data communication protocols is used in many of today's internetnetworks (internets). A TCP/IP-based internet provides a data packet switching system for communication between nodes (e.g., end-user workstations, servers, network devices, etc.) connected to the internet. With reference to FIG. 1, International Standards Organization (ISO) Open Systems Interconnection (OSI) Network-layer devices 105, 110, and 140, known as routers or switches, select a path and forward, i.e., route, IP datagrams between nodes connected to the internet 100. For example, internet 100 includes local area networks (LANs) 101 and 151, and wide area network (WAN) 102 interconnected by routers 105, 110 and 140. The routers route IP datagrams, for example, between nodes 115, 120, 125 and 130 attached to LAN 101 and nodes 145 and 150 attached to LAN 151.

As can be seen from FIG. 1, routers 105 and 110 provide multiple paths for transmitting IP datagrams from nodes on LAN 101 to nodes on other IP networks in the internet. To prevent generating and forwarding duplicate IP datagrams over the internet, each of the nodes on LAN 101 transmits a unicast IP datagram to only one of routers 105 and 110 as a next hop, or first hop, router. The next hop router forwards the datagram to a node on another IP network in the internet that is reachable via the router. As is well known in the art, a next hop router can be statically configured at each node as the default router (also referred to as the default gateway) towards another IP network. However, a static default router configuration provides a single point of failure in the event the default router becomes unavailable. To overcome this problem, next hop routers can be dynamically configured at each node, using a dynamic routing protocol such as the well known Routing Information Protocol (RIP) or Open Shortest Path First (OSPF) dynamic routing protocols. However, the reliability provided by a dynamic routing protocol is at the expense of node and router processing overhead, network overhead, interoperability problems, etc.

The single point of failure inherent in a static next hop router configuration can be overcome through the use of the Virtual Router Redundancy Protocol (VRRP). VRRP, as set forth in the Internet Society's Request For Comments 2338, April, 1998, is an election protocol that assigns responsibility to a master virtual router, wherein the master virtual router is one of two or more VRRP based routers attached to a LAN. VRRP provides dynamic fail-over in forwarding responsibility if the master virtual router, selected as one of the two or more VRRP routers on the LAN, becomes unavailable. In essence, and as explained in detail in RFC 2338, VRRP provides a redundant, relatively more reliable default path for transmission of IP datagrams destined to nodes on other EP networks.

For a better appreciation and understanding of the present invention, a brief review of the VRRP protocol follows. In the network illustrated in FIG. 2, routers 105 and 110 operate according to the VRRP. VRRP is based on the concept of a virtual router, which is an abstract object that operates as a default router for nodes attached to the LAN, and for which a single well known IEEE 802.3 MAC (Media Access Control) address is assigned. In network 100, two virtual routers are configured: virtual router 1, and virtual router 2. In general, the scope of a virtual router is restricted to a single LAN, and each virtual router comprises a master and one or more backup routers. For example, router 105 is the master virtual router and router 110 is the backup virtual router for virtual router 1. The master and backup virtual routers share the same virtual router identifier (VRID=1), same IP address (IP=A), and the same VRRP-based MAC address (00-00-5E-00-01-{VRID}(h), e.g., 00-00-5E-00-01-01(h)). Conversely, router 110 is the master virtual router and router 105 is the backup virtual router for virtual router 2, which has a VRID=2, IP address=B, and VRRP-based MAC address of 00-00-5E-00-01-02(h). In this example, nodes 115 and 120 are statically configured with a default next hop router IP address of "A", while nodes 125 and 130 are statically configured with a default next hop router IP address of "B". (Splitting the nodes between redundant routers in this manner provides load balancing and other advantages well known in the art).

In accordance with VRRP, the master virtual router functions as the forwarding router for the IP address associated with the virtual router. For example, router 105 is the master virtual router for virtual router 1, and forwards IP datagrams for the nodes having the IP address of virtual router 1 (IP address "A") statically configured as the default next hop router. The master virtual router periodically transmits advertisements, formatted as IP multicasts, to the backup virtual router(s) on the local network to indicate to the backup(s) that it is still functioning as the master virtual router. (Use of IP multicast allows VRRP to be implemented in multiaccess LANs such as Ethernet, Fast Ethernet, Gigabit Ethernet, FDDI, Token Ring, ATM LAN emulation (ATM LANE), etc.) If master virtual router 1 fails, e.g., advertisements cease, the master-down_timer expires or a shutdown event is received at the backup virtual router 1, backup virtual router 1 takes over as the new master virtual router 1, providing routing capability for nodes 115 and 120. Since both routers maintain the same IP address ("IP A"), and share the same VRRP based media access control (MAC) address, no reconfiguration of the static default next hop router IP address is required at each of the nodes that transmit IP datagrams to virtual router 1, destined for nodes on other IP networks. Likewise, if master virtual router 2 fails, backup virtual router 2 provides routing for nodes 125 and 130.

While the VRRP based network of FIG. 2 provides router redundancy and fail-over protection for nodes having statically configured default next hop router IP addresses, no such mechanism presently exists for protocol stacks other than TCP/IP. However, many of today's internets are a connected amalgamation of heterogeneous, originally isolated, data communication networks, wherein the routers often times are required to support multiprotocol routing capabilities, including data communication protocols for which a default router election protocol such as VRRP is not available. For example, in the internet depicted in FIG. 2, nodes 115 and 125 communicate with each other as well as nodes reachable via router 105 using both IP and the well known Network layer protocol Internet Protocol eXchange (IPX), yet VRRP does not provide routing redundancy support for IPX. What is needed is a system in which nodes utilizing data communication protocols in addition to the Internet Protocol (IP) can obtain the benefits of VRRP without implementing a separate default router election protocol.

BRIEF SUMMARY OF THE INVENTION

According to the present invention, nodes configured with data communication protocol suites other than TCP/IP, for which a default router election protocol such as VRRP is not available, nevertheless forward traffic destined to nodes on other network to the VRRP master virtual router. A non TCP/IP based node, given a statically configured Network layer address for a next hop router, resolves the Network layer address to a VRRP based MAC layer address for the next hop router, if the next hop router has VRRP enabled and is the master virtual router. The non TCP/IP node caches the VRRP based MAC address for use in forwarding non TCP/IP traffic to the appropriate next hop router. Thereafter, the non TCP/IP node forwards traffic destined to nodes on other networks to the VRRP master virtual router. If the master virtual router becomes unavailable to forward TCP/IP based traffic, it transitions to become the new backup virtual router, while the backup virtual router transitions to become the new master virtual router responsible for forwarding TCP/IP based traffic. The non TCP/IP based node, having cached the VRRP based MAC address of the next hop router, forwards traffic destined to nodes on other networks to the new master virtual router, which shares the same VRRP based MAC address as the former master virtual router.

BRIEF SUMMARY OF THE SEVERAL VIEWS OF THE DRAWINGS

The present invention is illustrated by way of example and not limitation in the following figures, in which.

DETAILED DESCRIPTION OF THE INVENTION

Described is a method and apparatus providing for nodes utilizing data communication protocols, e.g., Internet Protocol eXchange (IPX), or Internet Gateway Management Protocol (IGMP), in addition to the Internet Protocol (IP) can obtain the benefits of VRRP without implementing a separate default router election protocol.

In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention. For example, specific details are not provided as to whether the method is implemented in a switch as a software routine, hardware circuit, firmware, or a combination thereof.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Figure 1:
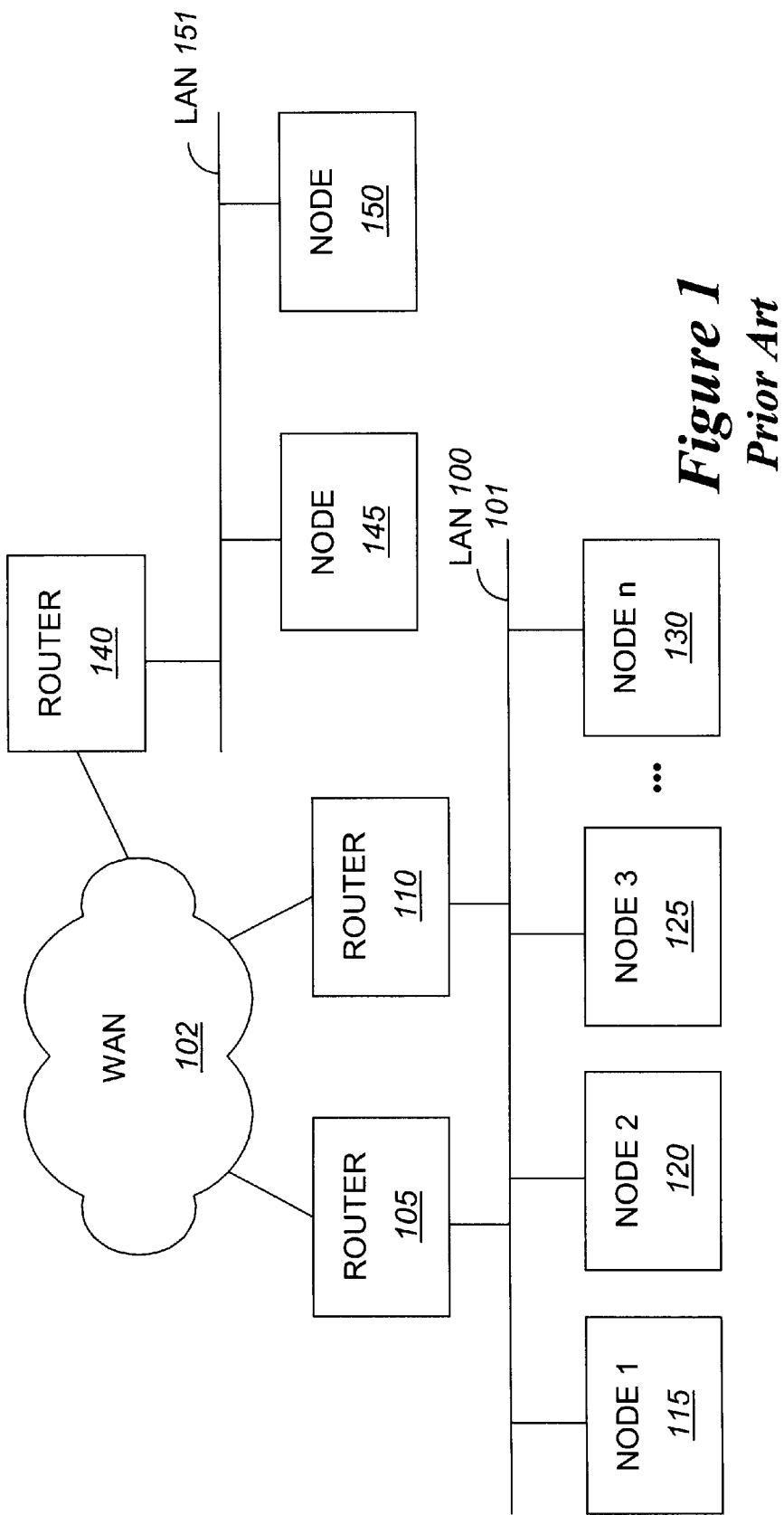
FIG. 1 is a diagram of a data communications internetwork.
Figure 2:
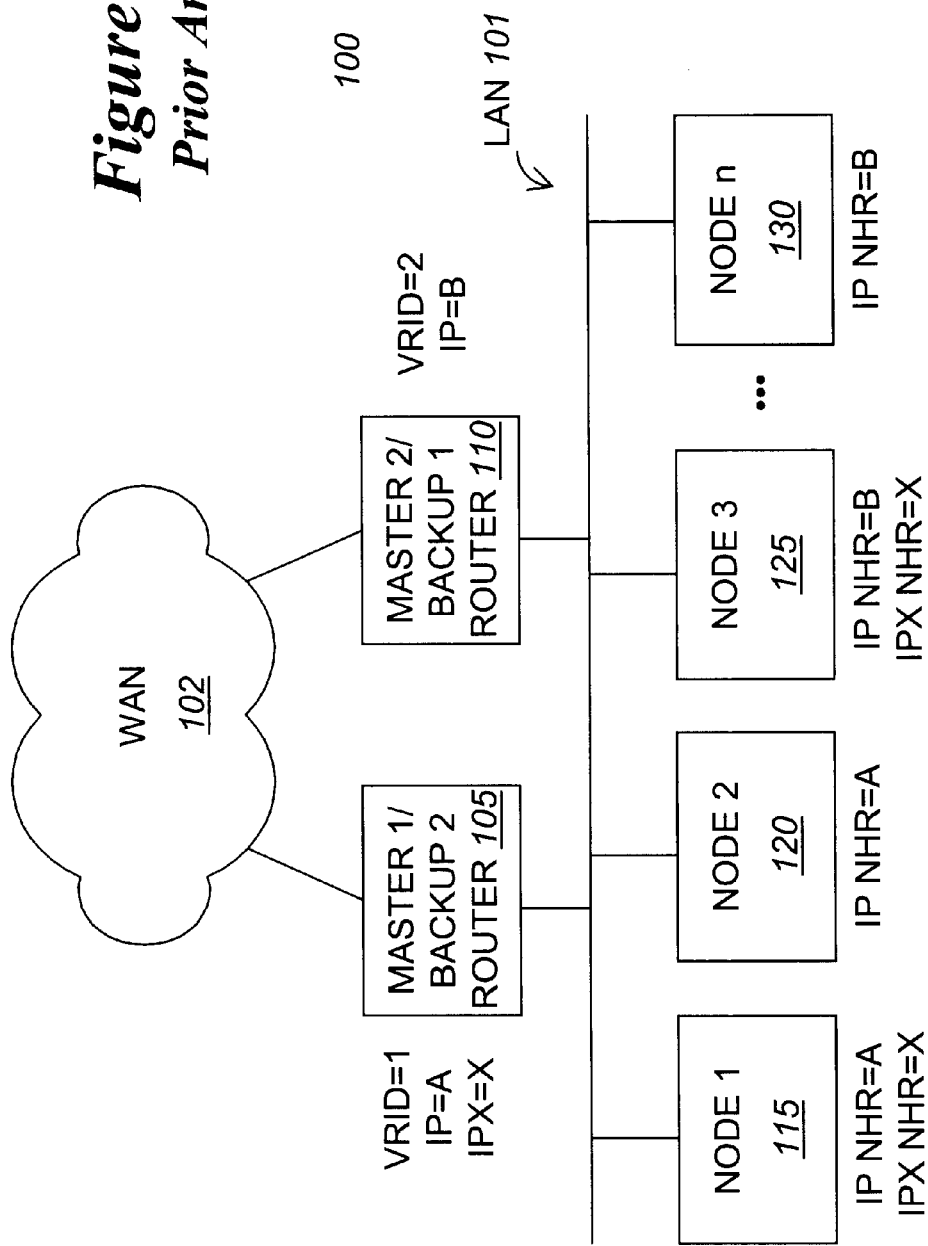
FIG. 2 is a diagram of a data communications internetwork that supports the virtual router redundancy protocol.
Figure 3:
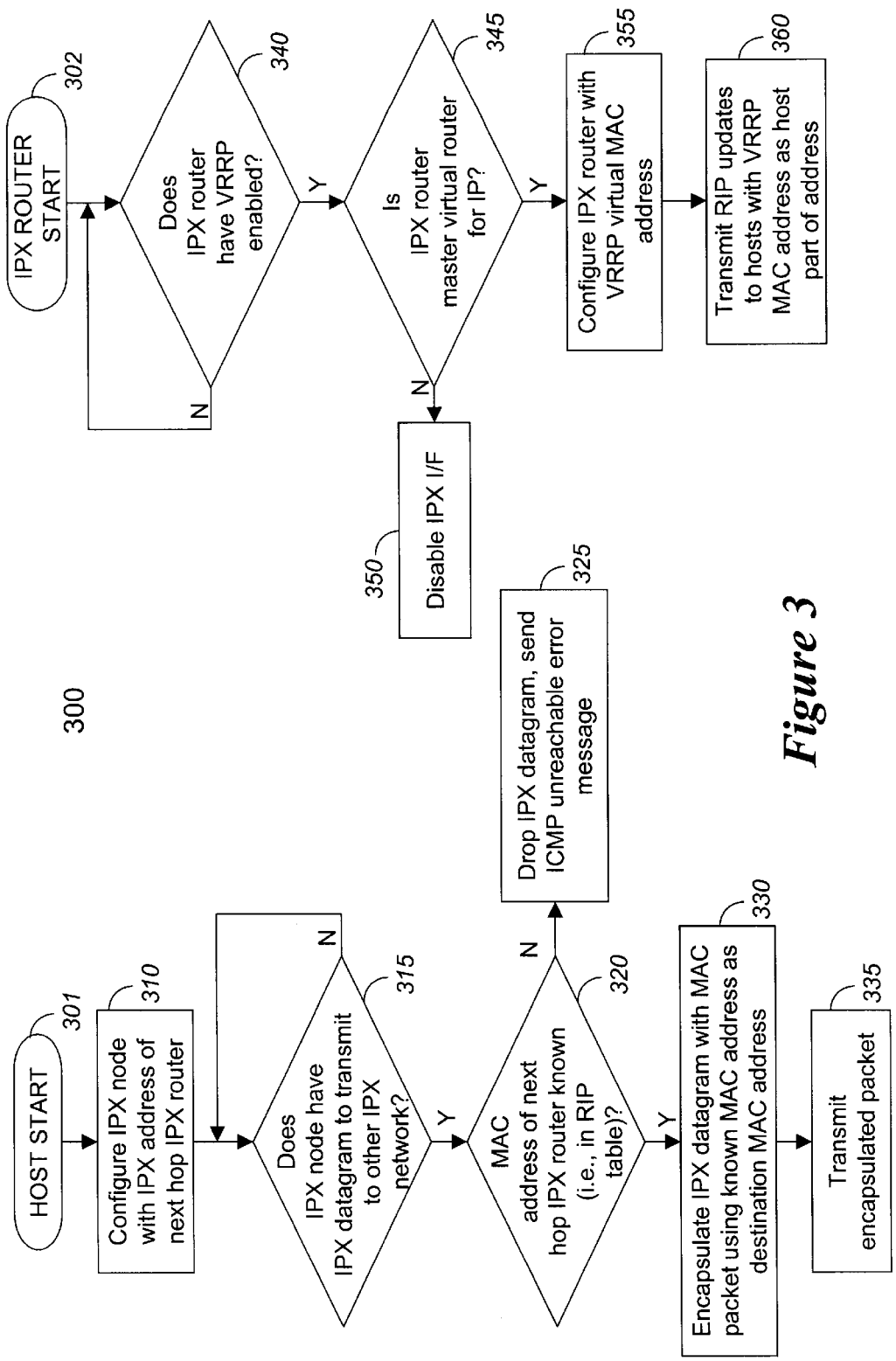
FIG. 3 is a flow chart of an embodiment of a method of the present invention.

In an internetwork operating in accordance with VRRP as depicted, for example, in FIG. 2, the present invention provides for router redundancy and fail-over protection for nodes having statically configured default next hop router addresses for protocol stacks other than TCP/IP. With reference to FIG. 3, an embodiment of a method of the present invention is set forth, using the IPX protocol as an example. However, it is appreciated that the present invention is applicable in the same manner with many other data communication protocols, e.g., IGMP relay, etc. The method is set forth in flow charts describing the process from the perspective of a node, beginning at 301, and from the perspective of the next hop IPX router, beginning at 302.

In the internet depicted in FIG. 2, nodes may communicate with each other via multiple Network layer protocols, e.g., IP and IPX. In particular, nodes 115 and 125 may communicate with nodes in or reachable beyond WAN 102 via routers 105 and 110, using either IP or IPX at the Network layer. At step 310, node 115 is statically configured with an IP address of "A" for a next hop IP router, and an IPX address of "X" for a next hop IPX router. As is well known in the art, when a source node sends a datagram to a destination node, the Network-layer destination address is that of the destination node. If, however, the Network layer destination address indicates that the node is on a different network (and therefore, reachable only by a Network layer router), then the MAC layer destination address is not that of the node, but rather that of the next hop router. Initially, e.g., on power up, the sending, or source, node knows the statically configured Network layer address of the next hop router, but not the MAC address of the next hop router. Both IPX and IP have well known mechanisms for resolving Network layer addresses to MAC addresses, and invoke such mechanisms, either upon boot up, or when transmitting a first datagram to a destination node in another network. Thus, at step 315, node 115, for example, waits until it has an IPX datagram to transmit to another node in a different IPX network before it checks, e.g., an internal table or cache such as a Routing Information Protocol (RIP) table, at step 320, for a MAC address associated with the IPX address (X) of the next hop IPX router.

If the MAC address of the next hop IPX router is in the node's cache, at step 330, the IPX datagram is encapsulated in a MAC packet, wherein the destination MAC address is the MAC address of the next hop IPX router. The MAC packet is then transmitted at step 335 to the next hop IPX router. (The next hop IPX router, of course, strips the MAC packet to retrieve the IPX datagram, looks in its routing tables for the subsequent next hop IPX router to which to forward the IPX datagram based on the destination IPX address in the datagram, encapsulates the IPX datagram in a MAC packet, wherein the destination MAC address is the MAC address of the subsequent next hop IPX router, or the destination node itself, if the destination node is directly reachable, i.e., attached to a network to which the next hop IPX router is attached).

If at step 320 the MAC address of the next hop IPX router is not in the source node's cache, the source node drops the IPX datagram and sends an Internet Control Message Protocol (ICMP) unreachable error message up the IPX protocol stack executing at the source node, as shown at step 325.

Recall from the above discussion that router 105 is a multiprotocol router, providing routing functionality for multiple protocols, e.g., both the IPX and IP protocols. Moreover, the router, in conjunction with router 110, has VRRP enabled to provide dynamic fail-over capabilities for IP in the event the router 105 becomes unavailable to route IP traffic. Thus, in accordance with the present invention, rather than sending out an IPX RIP update packet with the actual MAC address of its appropriate port, router 105 first determines at step 340 whether VRRP is enabled. If router 105 has VRRP enabled, it further determines at step 345 whether it is the master virtual router for IP traffic. If router 105 has VRRP enabled, and is the master virtual router for IP traffic, then at step 355, router 105 configures itself with the appropriate VRRP based MAC address, overriding the physical MAC address assigned to the port at which VRRP is enabled. At 360, router 105 then transmits its VRRP-based MAC address (e.g., 00-00-5E-00-01-01(h)) in its IPX RIP update packets. If in router 105 VRRP is enabled, or if VRRP is enabled but the router is the backup virtual router for IP traffic, then at step 350, router 105 disables IPX routing at the port for which VRRP is enabled. Moreover, if VRRP is disabled, the IPX interface comes back up and the router transmits its actual MAC address in its IPX RIP update packets.

In any case, node 115 caches the MAC address received from router 105, for example, in a RIP table or like data structure. Then, as discussed above, once the MAC address of the next hop IPX router is cached, whether that be the actual MAC address or the VRRP based MAC address, at step 330, the IPX datagram is encapsulated in a MAC packet, wherein the destination MAC address is the MAC address of the next hop IPX router stored in cache. The packet is then transmitted at step 335 to the next hop IPX router.

Thereafter, each time node 115 transmits IPX datagrams to another node in another IPX network, it routes the IPX datagrams to the next hop IPX router based on the MAC address stored in its cache. If the cache entry times out or expires, the process is repeated. Importantly, if router 105 becomes unavailable to route IP traffic, VRRP transitions between routers 105 and 110 so that router 110 becomes the new master virtual router and router 105 becomes the new backup virtual router for IP traffic. Since the new master virtual router uses the same VRRP based MAC address as the original master virtual router, the MAC address already stored in cache at node 115 is the VRRP based MAC address of router 10 as well. Thus, after the transition, all IPX traffic sourced by node 115 and destined for a node in another IPX network is automatically routed to that other IPX network via router 110, since it has the same VRRP based MAC address as router 105.

It is appreciated then, that depending on the IPX address of the next hop IPX router statically configured at each node in a shared network, and depending on the VRRP status of the next hop IP router when the node obtains a RIP update from the next hop IP router, it is quite possible that some IPX based nodes will forward all IPX traffic destined to another IPX network to the same next hop IPX router (if the router's actual MAC address is cached), while other IPX based nodes will forward all IPX traffic destined to another IPX network to a different next hop router (if that router's actual MAC address is cached), while still other IPX based nodes will forward IPX traffic destined to another IPX network to the one of the VRRP based routers that is the current master virtual IP router (if the router's VRRP-based MAC address is cached).

Figure 4:
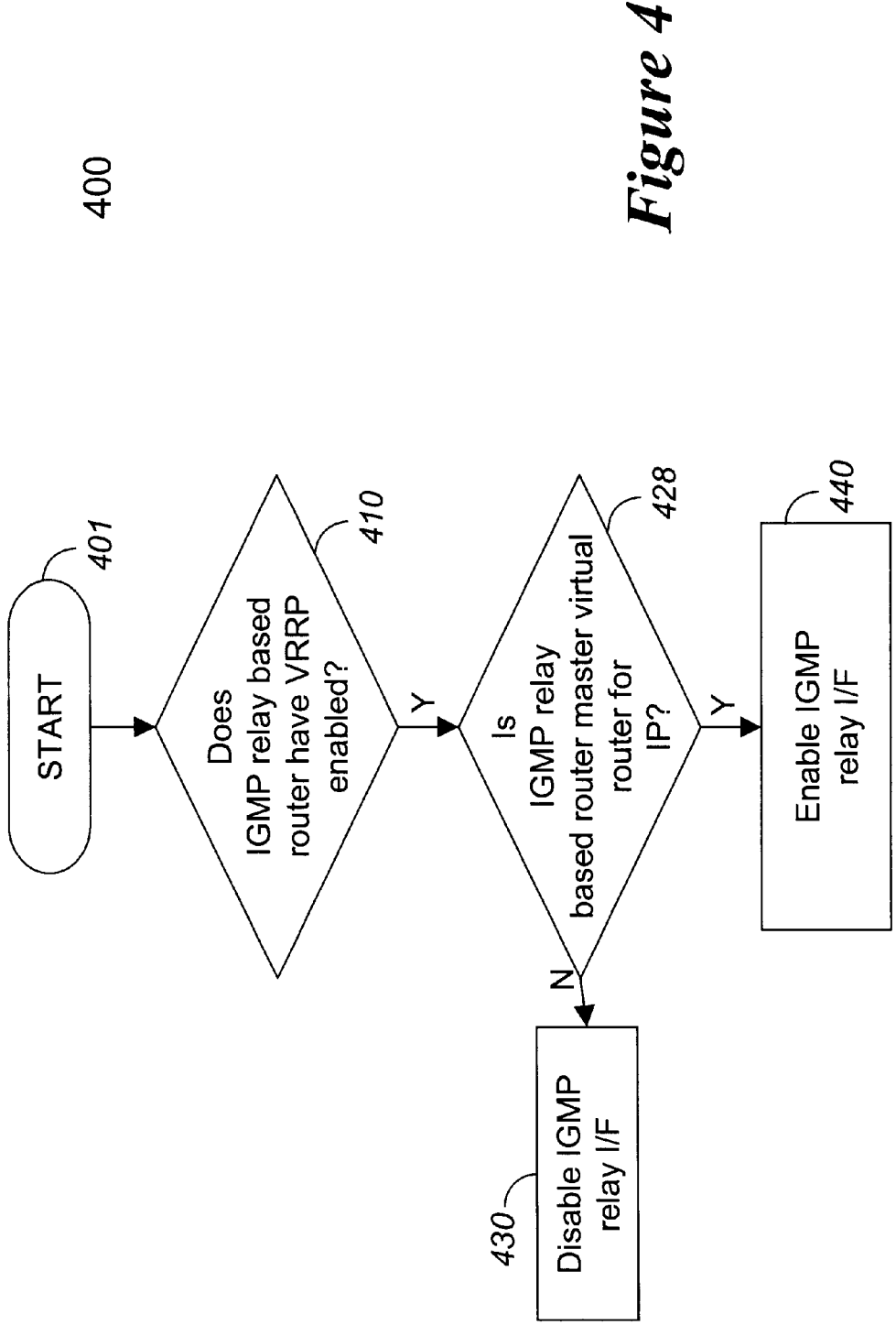
FIG. 4 is a flow chart of an embodiment of a method of the present invention.

In FIG. 4, an embodiment 400 of the process of the present invention as it relates to another protocol, the Internet Group Management Protocol (IGMP), is provided. Router 105, in conjunction with router 110, is configured to enable VRRP to provide dynamic fail-over capabilities for IP in the event the router 105 becomes unavailable to route IP traffic. Thus, in accordance with the present invention, router 105 first determines at step 410 whether VRRP is enabled. If router 105 has VRRP enabled, it further determines at step 420 whether it is the master virtual router for IP traffic. If router 105 has VRRP enabled, and is the master virtual router for IP traffic, then at step 440, router 105 enables IGMP Relay at the port where VRRP is enabled and in the master state. If VRRP is enabled but the router is the backup virtual router for IP traffic, then at step 430, router 105 disables IGMP relay at the port for which VRRP is enabled.

Whenever node 115 multicasts an IGMP packet, router 105 would be in the master state for the virtual router, and hence, the IGMP Relay interface would be enabled on that node to forward IGMP traffic. Router 10 would be in backup state and so the IGMP interface on that router would be disabled. When router 105 becomes unavailable, the IGMP interface on router 105 is disabled. Additionally, router 10 takes the role of the master, and the appropriate IGMP interface is enabled on router 110 to forward IGMP traffic received at the IGMP interface.

Embodiments of the invention may be represented as a software product stored on a machine-readable medium (also referred to as a computer-readable medium or a processor-readable medium). The machine-readable medium may be any type of magnetic, optical, or electrical storage medium including a diskette, CD-ROM, memory device (volatile or non-volatile), or similar storage mechanism. The machine-readable medium may contain various sets of instructions, code sequences, configuration information, or other data. For example, the procedures described above for synchronizing network address translation tables can be stored on the machine-readable medium. Those of ordinary skill in the art will appreciate that other instructions and operations necessary to implement the described invention may also be stored on the machine-readable medium.

What is claimed is:

1. In a network providing for a statically configured next hop router for a first protocol, a method for changing a default next hop router for a second protocol, comprising:

initializing a router connected to the network as the master next hop router for the first protocol;

determining if the router has Virtual Router Redundancy Protocol (VRRP) enabled;

configuring the router with a VRRP based Media Access Control (MAC) address that overrides a physical MAC address assigned to a port at which VRRP is enabled;

initializing a redundant router connected to the network as the backup next hop router for the first protocol;

initializing the router as the default next hop router for the second protocol; and if an event occurs causing a transition to the redundant router as a new master next hop router and a transition to the master next hop router as a new backup next hop router for the first protocol, then transitioning to the redundant router as the default next hop router for the second protocol.

2. The method of claim 1, wherein the first protocol is an Internet Protocol (IP).

3. The method of claim 2, wherein the second protocol is an Internet Protocol eXhange (IPX) protocol.

4. The method of claim 2, wherein the second protocol is an Internet Gateway Management Protocol (IGMP).

5. The method of claim 1, wherein the occurrence of the event causing a transition to the redundant router as a new master next hop router and a transition to the master next hop router as a new backup next hop router for the first protocol comprises a failure of the master next hop router to advertise itself as such within an appropriate time interval to the backup next hop router.

6. The method of claim 1, wherein the occurrence of the event causing a transition to the redundant router as a new master next hop router and a transition to the master next hop router as a new backup next hop router for the first protocol comprises a preemption of the master next hop router by the backup next hop router.

7. The method of claim 1, wherein the occurrence of the event causing a transition to the redundant router as a new master next hop router and a transition to the master next hop router as a new backup next hop router for the first protocol comprises a power failure of the master next hop router.

8. A software product stored on a machine-readable medium, for execution on a router connected to a network, comprising:

means for initializing the router connected to the network as the master next hop router for the first protocol;

means for determining if the router has Virtual Router Redundancy a Protocol (VRRP) enabled;

means for configuring the router with a VRRP based Media Access Control (MAC) address that overrides a physical MAC address assigned to a port at which VRRP is enabled;

means for initializing a redundant router connected to the network as the backup next hop router for the first protocol;

means for initializing the router as the default next hop router for the second protocol; and means for transitioning to the redundant router as the default next hop router for the second protocol if an event occurs causing a transition to the redundant router as a new master next hop router and a transition to the master next hop router as a new backup next hop router for the first protocol.

9. A method for providing redundancy and fail-over protection in a router that forwards Internet Protocol (IP) and at least one other network layer protocol, the method comprising:

determining if the router has Virtual Router Redundancy Protocol (VRRP) enabled;

determining if the router is a master virtual router for IP traffic;

configuring the router with a VRRP based Media Access Control (MAC) address that overrides a physical MAC address assigned to a port at which VRRP is enabled; and transmitting the VRRP based MAC address in a Routing Information Protocol (RIP) update packet.

10. The method of claim 9, further comprising disabling routing for the at least one other network layer protocol at the port for which VRRP is enabled.

11. The method of claim 10, further comprising transmitting the physical MAC address in the RIP update packet.

12. A router providing router redundancy and fail-over protection for Internet Protocol (IP) and at least one other network layer protocol, the router comprising;

means for determining if the router has Virtual Router Redundancy Protocol (VRRP) enabled;

means for determining if the router is a master virtual router for IP traffic;

means for configuring the router with a VRRP based Media Access Control (MAC) address that overrides a physical MAC address assigned to a port at which VRRP is enabled; and means for transmitting the VRRP based MAC address in a Routing Information Protocol (RIP) update packet.

13. The router of claim 12, further comprising means for disabling routing for the at least one other network layer protocol at the port for which VRRP is enabled.

14. The router of claim 13, further comprising means for transmitting the physical MAC address in the RIP update packet.

* * * * *